April 30, 1968   R. P. URBAN   3,380,165
ANGLE GAUGE
Filed Oct. 6, 1965
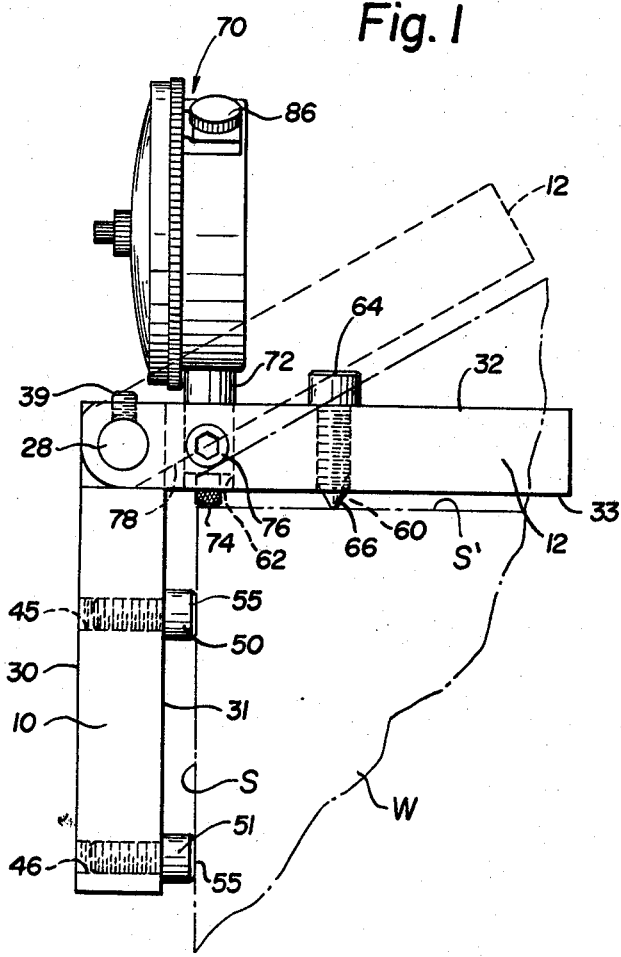
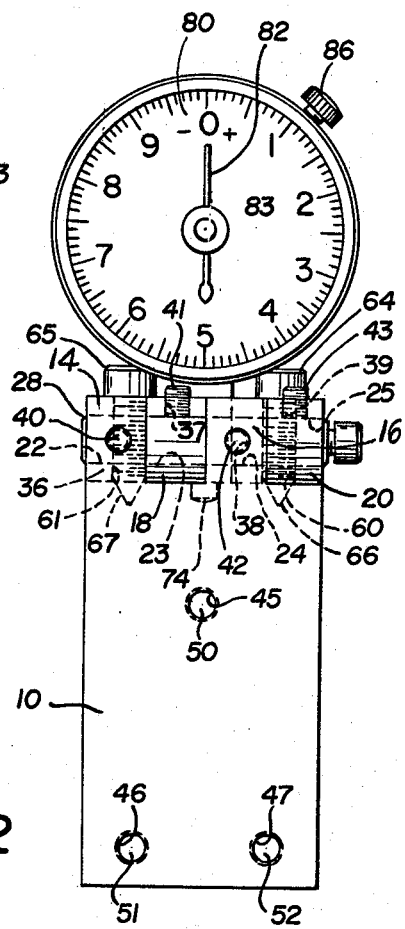
INVENTOR.
ROBERT P. URBAN
BY
*Watts & Fisher*
ATTORNEYS.

United States Patent Office 3,380,165
Patented Apr. 30, 1968

3,380,165
ANGLE GAUGE
Robert P. Urban, 3856 W. 227th St.,
Fairview Park, Ohio 44126
Filed Oct. 6, 1965, Ser. No. 493,494
8 Claims. (Cl. 33—75)

ABSTRACT OF THE DISCLOSURE

An adjustable angle gauge for checking and measuring the deviation of two adjacent surfaces of a work piece relative to a desired predetermined angular relationship, the gauge has two pivotally connected rigid members, each with three, fixed, non-aligned projections for contacting the work piece. One of the three projections on one of the members is movable relative to the member and is connected with an indicator.

---

This invention relates to an angle gauge, and more particularly to an adjustable gauge for checking and measuring the deviation of two adjacent surfaces of a work piece relative to a desired predetermined angular relationship.

In the production of articles of manufacture, particularly those manufactured to close tolerances, such as machined metal parts, it is usually necessary for adjacent surfaces of articles to bear a specified relationship to each other. For example, many parts, either as manufactured or assembled, have two adjacent flat surfaces that must be square to each other, i.e., form a right angle. In other instances, the angular relationship may be other than square while yet requiring an accurate conformance to a specified angle. In general, a predetermined degree of accuracy must be maintained along the entire length of the adjoining surfaces. In some machining operations, such precision grinding, an extremely high degree of accuracy must be maintained. It is therefore important that an accurate gauge be available to determine the accuracy with which such parts are manufactured. In general, however, an accurate gauge is normally an expensive gauge because it must itself be machined and fabricated with great precision.

Perhaps the most common instrument for determining the accuracy of a right angle relationship between two surfaces is a square. This is an instrument having two sides that form an angle of 90 degrees. The accuracy of the relationship between two adjacent surfaces is checked by sliding the two right angle surfaces of the square along the two surfaces to be checked. If light can be seen between the surface of the square and the surface of the object being tested, the two surfaces do not meet at a right angle. The actual extent to which the angular relationship varies from 90 degrees cannot be judged with any degree of accuracy with this instrument. Moreover, because the instrument is in substantial contact with the surfaces as it is moved in sliding contact along the work piece, burrs or other defects hinder its use. Accordingly, it is often necessary to deburr the article before it can be checked for accuracy. This type and other types of gauges used for this purpose must be manufactured with great precision to provide straight surfaces and an accurate, right angle relationship between the two surfaces of the instrument.

In accordance with the present invention, an angle gauge is provided having a high degree of accuracy without precision fabrication, and which may be readily adjusted to angles other than 90 degrees. Briefly, the gauge of the present invention is formed of two flat members hinged together at their ends so that the angular relationship between the two members may be varied. Three spaced projections extend from a surface of each of the members toward an inclined angle formed between the two members of the gauge. The three projections of one member are relatively fixed and arranged in a triangular configuration so that the projecting ends define a plane. The second member of the gauge includes two fixed projections to define a plane. The movable projection moves toward and away from the plane of the flat support member and is connected to an indicator for indicating the magnitude of such movement.

In use, the two hinged members are set to and maintained in a predetermined angular relationship by placing the projections of each member against adjacent surfaces of a master gauge block of the desired angle. The indicator is then set to read zero or a reference reading is noted. Thereafter, the gauge will accurately indicate the extent of deviation of any work piece from the preset and calibrated angle, the degree of accuracy being dependent upon the accuracy of the indicator. Dial indicators suitable for use as a part of this gauge are obtainable that are accurate to .0001 inch. That is, the accuracy of the gauge of the present invention is obtained without regard to the exact position of any of the abutments projecting from the two members of the gauge. Therefore, it is not necessary that the parts be accurately machined or assembled with precision to provide an accurate instrument. The ends of the three projections of each member of the gauge at all times define a plane, regardless of the extent to which the projections extend from the two hinged members. Any misalignment is compensated for by the reference reading when the projections are abutted against the two adjacent surfaces of a master gauge block.

Other features and attendant advantages of this invention will be appreciated as the invention becomes better understood by reference to the following detailed description when considered in connection with the accompanying drawing in which:

FIGURE 1 is a side elevational view of a gauge constructed in accordance with the present invention and indicating the manner in which the gauge cooperates with a work piece or master gauge block in contacting adjacent surfaces thereof;

FIGURE 2 is a front elevational view of the gauge shown in FIGURE 1; and

FIGURE 3 is a partial side elevational view of a modified embodiment of a gauge constructed in accordance with the present invention.

Referring now to the drawings, the angle gauge is shown comprised of two rigid rectangular body blocks 10 and 12. Both blocks 10, 12 are of identical shape. Block 10 has two spaced extending ears 14, 16 at one end, and block 12 has two spaced extending ears 18, 20 at one end. Each ear is the full thickness of the block and is equal in width to ¼ of the width of the block. The two ears of each block are spaced from each other a distance equal to the width of an ear. The ear 16 of block 10 and the ear 18 of block 12 are interposed between the two ears of the opposite block in hinge-like fashion to secure the two blocks together. Each ear 14, 16, 18, 20 has a central throughbore 22, 23, 24, 25, respectively, extending in the direction of the width of the respective blocks 10, 12. A hinge pin 28 extends through the throughbores 22–25 to secure the two blocks 10, 12 together, while permitting relative pivotal movement about the axis of the hinge pin 28.

With the blocks 10, 12 hinged together by pin 28 in the position shown in FIGURE 1 of the drawings, the block 10 has an outside surface 30 and an inside surface 31. The block 12 has an outside surface 32 and an inside surface 33. Tapped holes 36, 37, 38, 39 are provided, one in each ear 14, 16, 18, 20, respectively. These holes communicate between the respective outside surface of the block and the throughbores 22–25. Headless socket set screws 40, 41, 42, 43 are received, respectively, in the tapped holes 36, 37, 38, 39 and hold the two body blocks 10, 12 in a preset angular relationship when the screws are tightened into firm contact with the hinge pin 28.

Three tapped holes 45, 46, 47 are provided in body block 10. The hole 45 is located midway across the width of the block 10 and somewhat closer to the ears 14, 16, than to the opposite end of the block 10. The other two holes 46, 47 are aligned across the width of the block 10 adjacent the end opposite from the ears. The exact position of the holes 45, 46, 47 is not important, as long as they are substantially spaced from each other and not aligned. The triangular arrangement as shown in the drawings effectively provides satisfactory spacing. Socket head cap screws 50, 51, 52 are respectively received in the tapped holes 45, 46, 47 with the heads extending from the inside surface 31 of the body block 10 and tightly abutted thereto. The heads of the cap screws 50, 51, 52 provide three spaced projections or abutments extending from the inside surface 31 of the body block 10. Each cap screw has a flat top surface 55, and the three flat surfaces define an imaginary plane spaced from the inside surface 31 of the body block 10. While the surfaces 55 of each cap screw 50, 51, 52 are essentially parallel and equally spaced from the inside surface of the body block 10, the accuracy of the angle gauge in no way depends upon an accurate predetermined relationship among the three cap screws. In fact, none of the surfaces of body block 10 or 12 are machined to an accurate dimension or surface finish of the order to which the assembled gauge is capable of measuring.

Two tapped holes 60, 61 are provided approximately midway between the two ends of the body block 12 and spaced laterally across the width thereof. A third hole 62 also extends through the body block 12, centrally located with respect to the width of the block, and adjacent the ears 18 and 20. Socket head set screws 64, 65 are received in the tapped holes 60, 61, respectively. The screws have cone points 66, 67 and are positioned with the screw heads in close abutment with the outside surface 32 and with the cone points 66, 67 extending beyond the inside surface 33 of the body block 12.

A dial indicator 70 is supported on the body block 12 by a stem 72 that is received in the smooth walled hole 62. The dial indicator 70 extends from the outside surface 32 of the body block 12, and a spring loaded measuring spindle 74 extends downwardly from the stem 72 through the hole 62 beyond the inside surface 33 of the block 12. A headless socket set screw 76 is received in a threaded bore 78 that extends through the side of the body block 12 and in communication with the hole 62. The set screw 76 secures the dial indicator stem 72 within the hole 62, and with the spring loaded measuring spindle 74 extending from the inside surface 33 a distance that substantially corresponds with the distance to which the cone points 66, 67 extend.

The dial indicator 70 includes a graduated dial 80 that reads in thousandths of an inch. A pointer 82 rotates about a central pivot 83 in response to reciprocal movement of the spring loaded measuring spindle 74 in the stem 72. The rim of the dial or bezel 85 is rotatable so that the zero setting on the graduated dial 80 may be rotated and brought opposite the position of the pointer 82 for convenient reading from any predetermined reference. A lock adjustment screw 86 retains the dial in adjusted position.

The terminal end of the spring loaded measuring spindle 74 extends beyond the inner surface 33 and, together with the cone points 66, 67 of the two set screws 64, 65, defines an imaginary plane substantially at right angles to the plane defined by the flat surfaces 55 of the cap screws 50, 51, 52 associated with body block 10. The cone points 66, 67 are aligned transversely across the width of the block 12 so that their axis of alignment is parallel to the hinge pin 28, forming the base of an isosceles triangle with the spindle 74 at the apex. For convenience, the distance from this axis of alignment to the central axis of the measuring spindle 74 (i.e., the altitude of the triangle) is one inch. With this arrangement, the dial indicator 70 will give a reading of the taper of the surface being checked in thousandths of an inch per inch.

As indicated in phantom in FIGURE 1 of the drawings, the angular relationship between the two body blocks 10 and 12 need not be 90 degrees. By loosening the two set screws 40, 42 in the ears 14, 16, the body 10 may be rotated relative to the block 12 about the hinge pin 28 to conform to a desired obtuse angle. The blocks may be opened beyond 180 degrees to measure an internal angle. The dial indicator may be turned around to facilitate this.

Where it is desired to utilize the angle gauge with angles of less than 90 degrees as well as angles greater than 90 degrees, modified body blocks 10′ and 12′ may be used, as shown in FIGURE 3 of the drawings. This embodiment is identical to that of FIGURES 1 and 2, with the exception of a contoured surface 91 along the edge of the block 10′ next to each of the extending ears, and a similar contoured surface 92 of the block 12′. These surfaces taper toward the inside surface 31′ or 33′ of each block and permit the two blocks 10′ and 12′ to pivot beyond the point where the thickness of each block would otherwise engage the extending ears of the other block and prevent further movement about the hinge pin 28. The same result can be accomplished by lengthening the ears so they are longer than the thickness of the blocks and locating the pivot pin adjacent the outer ends of the ears.

By way of illustration, a workpiece W is shown in phantom in FIGURE 1. The work piece W has two adjacent surfaces S and S′ that form a right angle. It is desired to check the accuracy of the surface S′ with respect to the surface S. This may be done by first substituting a master gauge block for the work piece W, in the same relationship to the angle gauge as that occupied by the work piece W. The flat surfaces 55 of the cap screws 50, 51, 52 are placed against one surface of the master gauge block and the cone points 66, 67 and the measuring spindle 74 are placed against the adjacent right angle, surface of the master gauge block. If necessary, (i.e., if there is a substantial variance between the angular relationship of the blocks 10, 12 and the gauge block) the set screws 40 and 42 are loosened, the angular adjustment between the body block 10 and 12 changed, and the set screws 40, 42 again tightened. The granuated dial 80 is set with the zero mark beneath the pointer 82, wherever it may be pointing, and the angle gauge is ready to be used to check the accuracy of the work piece W.

The angle gauge is now placed at the edge of the work piece W where the two surfaces S and S′ join. The flat surfaces 55 are placed against the finished surface S and the cone points 66 and the measuring spindle 74 are placed against the surface S′ to be checked in its relationship to surface S. To the extent the included angle between the surface S and S′ is less than 90 degrees, the corner of the work piece formed by the two surfaces S and S′ will be closer to the inside surface 33 of the block 12 than was the corner of the gauge block. As a result, the measuring spindle 74 will be pushed upward in the orientation of FIGURE 1 and the pointer 82 will indicate this difference. If the angle is greater than 90 degrees the spindle will be spring biased downward and the pointer 82 will move in the opposite direction. Because the measuring spindle 74 is one inch from the axis of alignment of the points 66, 67, the distance that the measuring spindle moves indicates the total change of the surface S′ for each inch of length. Thus, where the graduated dial 80 is calibrated in thousandths of an inch, the reading indicates a taper in thousandths of an inch per inch of length.

It will be appreciated that the accuracy to which the various parts of the angle gauge are made or assembled becomes unimportant because the three flat surfaces 55, the two cone points 66 and the spring loaded measuring spindle 74 can always be placed firmly in contact with the two related surfaces to be check. Once the dial indicator 70 has been adjusted for the relationship of the surfaces of the master gauge block, the angle gauge will correctly indicate variations from this relationship.

As can be best seen from FIGURE 1, the central axis of the spring loaded measuring spindle 74 is spaced farther from the plane of the surface 31 than are the flat surfaces 55 of each cap screw 50, 51, 52. Thus, the measuring spindle 74 contacts the surface S' inwardly from the corner thereof. The surfaces 55 themselves as well as the points 66, 67 of the set screws 64, 65 are also spaced from the corner of the work piece being checked. With this arrangement, burrs or snags that might still be adhered to the corner of the work piece need not be first removed before the accuracy of the surfaces can be checked. An inspector may slide the gauge along the surfaces S and S' to check for accuracy at various points along the work piece without snagging the gauge on such burrs that might be still adhered to the edge where the two surfaces meet.

From the above it will be apparent that an inexpensive and accurate angle gauge has been provided, which may be readily adjusted to any one of plurality of angles, greatly increasing the scope and usefulness of the gauge. While certain preferred embodiments of the invention have been disclosed, numerous modifications or alterations may be made therein without departing from the spirit and scope of the invention, as set forth in the appended claims.

What is claimed is:

1. An angle gauge which comprises two rigid body members, each including a through bore; means, including a hinge pin located in the through bores connecting the two body members together for relative angular adjustment about a pivot axis; means for locking the two members in an angular relationship about the pivot axis to define an included angle between facing surfaces of the two body members; three fixed spaced projections extending from one of the facing surfaces of one of the body members; two fixed spaced projections and an indicator actuator extending from the other of the facing surfaces of the other body member, the two fixed projections being spaced along a line essentially parallel to and spaced from the pivot pin and with the indicator actuator closer to the pivot pin and forming the apex of an isosceles triangle, the base of which is defined by the two fixed projections; and a dial indicator connected to the indicator actuator and mounted on the body portion having the two fixed spaced projections.

2. An angle gauge which comprises connected angularly related intersecting first and second rigid body members; three fixed projections extending from the first of the rigid body members in spaced relationship to each other in a triangular arrangement, i.e., non-aligned, and spaced from the intersection of the body members, said three projections defining a first imaginary plane; three projections extending from the second of the rigid body members in spaced relationship to each other in a triangular arrangement, i.e., non-aligned, and spaced from the intersection of the body members, said three projections defining a second imaginary plane that intersects the said first plane along an imaginary line of intersection, two of said projections being fixed relative to the second body member and the third projection being movable toward and away from the second body member to define varying imaginary planes with the said two fixed projections of the second body member, said two fixed projections being located on a common side of an imaginary line passing through the movable projection in a direction parallel to the said line of intersection of the two planes; means supporting the said third projection for said movement relative to the second body member; and an indicator supported by said second body member and connected with said third projection to indicate changes in the position of the third projection relative to the second body member.

3. An angle gauge which comprises first and second rigid body members; means pivotally connecting the body members together for relative angular adjustment; means for locking the two body members in a selected angular relationship; three fixed projections extending from the first of the rigid body members in spaced relationship to each other in a triangular arrangement, i.e., non-aligned, and spaced from the means pivotally connecting the body members, said three projections defining a first imaginary plane; three projections extending from the second of the rigid body members in spaced relationship to each other in a triangular arrangement, i.e., non-aligned, and spaced from the means pivotally connecting the body members, said three projections defining a second imaginary plane that intersects the said first plane along an imaginary line of intersection, two of said projections being fixed relative to the second body member and the third projection being movable toward and away from the second body member to define varying imaginary planes with the said two fixed projections of the second body member, said two fixed projections being located on a common side of an imaginary line passing through the movable projection in a direction parallel to the said line of intersection of the two planes; means supporting the said third projection for said movement relative to the second body member; and an indicator supported by said second body member and connected with said third projection to indicate changes in the position of the third projection relative to the second body member.

4. An angle gauge which comprises first and second rigid body members; means including a hinge pin pivotally connecting the body members together for relative angular adjustment; means at the pivotal connection for locking the two body members in a selected angular relationship; three fixed projections extending from the first of the rigid body members in spaced relationship to each other in a triangular arrangement, i.e., non-aligned, and spaced from the means pivotally connecting the body members, said three projections being partially received in apertures of the first body member and defining by projecting end portions a first imaginary plane; three projections extending from the second of the rigid body members in spaced relationship to each other in a triangular arrangement, i.e., non-aligned, and spaced from the means pivotally connecting the body members, said three projections defining by projecting end portions a second imaginary plane that intersects the said first plane along an imaginary line of intersection, two of said projections being fixed relative to the second body member and partially received in apertures of the second body member and the third projection being movable through an aperture in the second body member toward and away from the second body member to define varying imaginary planes with the said two fixed projections of the second body member, said two fixed projections being located on a common side of an imaginary line passing through the movable projection in a direction parallel to the said line of intersection of the two planes; means supporting the said third projection for said movement relative to the second body member; and a dial indicator supported by said second body member and connected with said third projection to indicate changes in the position of the third projection relative to the second body member.

5. The gauge of claim 1 in which the three fixed spaced projections extending from said one of the facing surfaces are not aligned.

6. The gauge of claim 5 wherein the three fixed spaced projections each extend from the associated facing surface a substantially equal distance and wherein the two fixed spaced projections each extend from the associated facing surface a substantially equal distance.

7. The gauge of claim 6 wherein the two fixed spaced projections are pointed.

8. The gauge of claim 7 wherein the altitude of the said isosceles triangle is equal to one inch.

References Cited

UNITED STATES PATENTS

| | | | |
|---|---|---|---|
| 787,248 | 4/1905 | Wilson | 33—105 |
| 1,366,878 | 1/1921 | Curry | 33—115 |
| 2,689,412 | 9/1954 | Young | 33—207 |
| 3,047,956 | 8/1962 | German | 33—174 |

FOREIGN PATENTS

| | | |
|---|---|---|
| 1,221,713 | 1/1960 | France. |
| 603,608 | 10/1934 | Germany. |
| 15,461 | 1/1956 | Germany. |
| 29,318 | 1910 | Great Britain. |
| 668,229 | 3/1952 | Great Britain. |

OTHER REFERENCES

"A New Use for a Lens Measure," American Machinist, Dec. 3, 1931, p. 861.

HARRY N. HAROIAN, *Primary Examiner.*

UNITED STATES PATENT OFFICE

CERTIFICATE OF CORRECTION

Patent No. 3,380,165                          April 30, 1968

Robert P. Urban

It is certified that error appears in the above identified patent and that said Letters Patent are hereby corrected as shown below:

Column 2, line 2, "inclined" should read -- included --; line 66, "With the blocks" should read -- With the two blocks --. Column 4, line 49, "granuated" should read -- graduated --.

Signed and sealed this 30th day of September 1969.

(SEAL)
Attest:

Edward M. Fletcher, Jr.                      WILLIAM E. SCHUYLER, JR.
Attesting Officer                              Commissioner of Patents